US005243364A

United States Patent [19]

Itoh

[11] Patent Number: 5,243,364
[45] Date of Patent: Sep. 7, 1993

[54] LIGHT-EMITTING DIODE PRINT HEAD

[75] Inventor: Masahiro Itoh, Tokyo, Japan
[73] Assignee: Eastman Kodak Company, Rochester, N.Y.

[21] Appl. No.: 831,019
[22] Filed: Feb. 4, 1992

[30] Foreign Application Priority Data

Apr. 1, 1991 [JP] Japan ................ 3-68319

[51] Int. Cl.[5] ................ G01D 15/06
[52] U.S. Cl. ................ 346/155; 346/154
[58] Field of Search ................ 346/155, 154

[56] References Cited

U.S. PATENT DOCUMENTS 4,706,130 11/1987 Yamakawa ................ 346/154 X
4,821,051 4/1989 Hediger ................ 346/155
4,914,457 4/1990 Fukatsu et al. ................ 346/155
4,947,195 8/1990 Flynn et al. ................ 346/155

*Primary Examiner*—George H. Miller, Jr.
*Attorney, Agent, or Firm*—Raymond L. Owens

[57] ABSTRACT

A light emitting diode (LED) print head with a high-density print capability is achieved through an arrangement that produces high-density connections between an LED array and associated LED drivers. The LED array and LED drivers are mounted on a system board. A lens array that focuses light from the LED array onto a remote printing surface is attached to a lens array frame. Formed on at least one mounting leg of the lens array frame are metal contacts that correspond in number to the number of associated LED array and LED driver electrodes to be interconnected. When the lens array is mounted on the LED array and LED drivers, the metal contacts bridge the space between the associated LED and LED driver electrodes and thereby connect the associated electrodes of the LED array and the LED drivers in the same operation.

11 Claims, 1 Drawing Sheet

LIGHT-EMITTING DIODE PRINT HEAD

FIELD OF THE INVENTION

The present invention relates to a light-emitting diode (LED) print head, and, more particularly, to an LED print head having an improved arrangement for electrically connecting an LED array to associated LED drivers.

BACKGROUND OF THE INVENTION

In recent years, the advent of the electronic information society has led to a vast increase in the amount of information that has to be processed. In turn, this has generated an increasing need for printers able to print faster and with a higher print density, such as laser printers and LED printers. An LED printer prints by electrically controlling the individual light-emitting diodes of the LED array. Since LED printers have few moving parts, the LED printers can be made smaller in size than certain other types of printers.

In the conventional (prior art) LED printer, the print head comprises an array of light-emitting diodes (LEDs), drivers for driving each of the LEDs of the LED array, and a lens array (i.e., a self-focusing lens array) with a refractive index profile that focuses light emitted by the LEDs of the LED array onto a predetermined surface. All of these components are mounted on a system board. Thus, the LED array and associated LED drivers are arranged on a system board, and pairs of wires are used to connect electrodes of the LED array to associated electrodes of the LED drivers. The print head is completed by then mounting the lens array in position over the LED array.

A problem with conventional print heads is that since individual pairs of wires are used to connect the electrodes of the LEDs of the LED array with their LED drivers, the precision of the connections depends on the mechanical precision of the bonding machine that does the wiring. Such wiring process is time-consuming and requires numerous steps. In addition, the implementation of high-density printing is prevented by the inability to establish high-precision execution of wiring pitch.

SUMMARY OF THE INVENTION

The present invention is directed to providing a light-emitting diode print head which is simple to manufacture and can produce high-density print. More particularly, the light emitting diode print head comprises a plurality of LEDs formed in an array and mounted on a substrate, each LED comprising at least one electrode; a plurality of LED drivers mounted on the substrate in a spaced-apart relationship to the plurality of LEDs, each of the LED drivers comprising at least one electrode; and a lens array attached to a lens array frame. The lens array frame comprises a predetermined surface which is patterned with metal contacts that correspond in number to the number of LED array electrodes and associated LED driver electrodes. The lens array frame is positioned so that the patterned metal contacts on the predetermined surface bridge the space between electrodes of the array LEDs and associated electrodes of the LED drivers and make electrical contact therebetween.

Viewed from another aspect, the present invention is directed to a light emitting diode print head. The light emitting diode print head comprises a plurality of LEDs formed in an array and mounted on a substrate, each LED comprising at least one electrode; a plurality of LED drivers mounted on the substrate in a spaced-apart relationship to the plurality of LEDs, each of the LED drivers comprising at least one electrode; and a lens array mounted in a lens array frame. The lens array frame is oriented to contact predetermined opposing sides of the lens array. The lens array frame comprises a predetermined surface which is patterned with metal contacts that correspond in number to the number of LED array electrodes and associated LED driver electrodes. The lens array frame is positioned so that the patterned metal contacts on the predetermined surface are oriented to match the electrode orientation of the array LEDs and associated electrodes of the LED drivers and bridge the space therebetween and provide electrical contact between the associated electrodes.

The invention and its various advantages will be better understood from the following more detailed description taken with the accompanying drawings and claims.

The drawings are not necessarily to scale.

DETAILED DESCRIPTION

Figure 1:
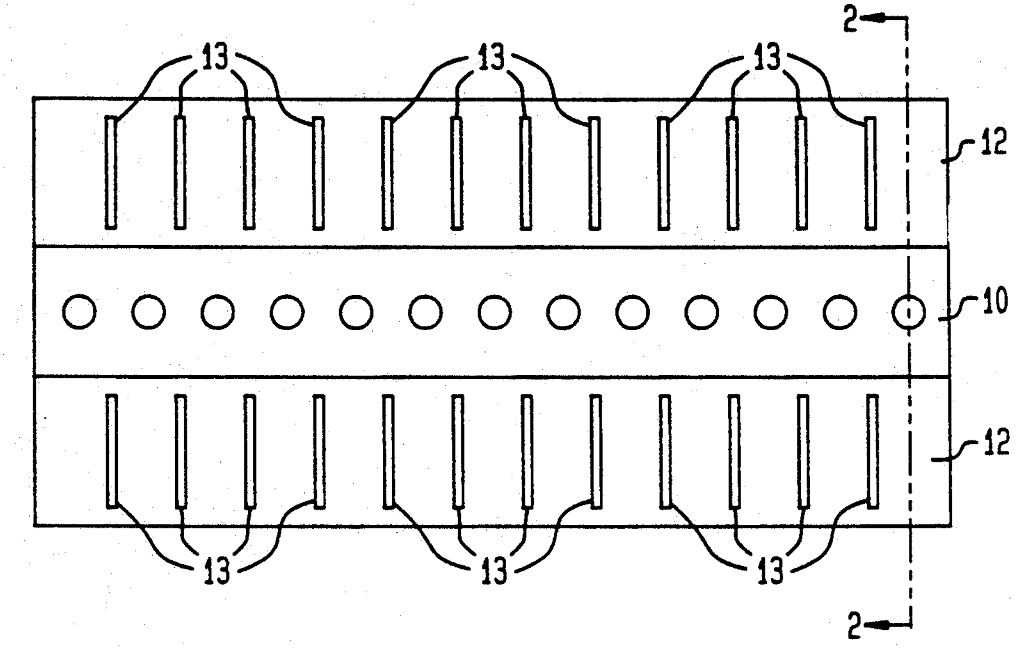
FIG. 1 shows a bottom plan view of an embodiment of a lens array in accordance with the present invention.

Referring now to FIG. 1, there is shown a bottom plan view of a lens array 10 in accordance with a preferred embodiment of the invention. The lens array 10 comprises a plurality of self-focusing lenses (not shown), with opposing sides of the lens array 10 being attached to a lens array frame 12. More particularly, the lens frame 12 is formed of first and second leg sections attached to first and second opposite sides, respectively, of the lens array 10. Each of the leg sections of the lens array frame 12 comprises a pattern of a plurality of elongated metal contacts 13. The elongated metal contacts 13 are formed substantially parallel to each other and in a direction normal to the opposing sides of the lens array 10 on a bottom surface of each leg section of the lens array frame 12.

Figure 2:
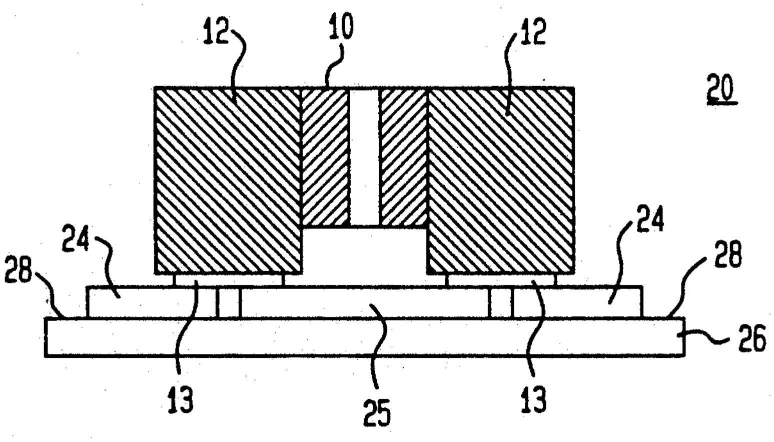
FIG. 2 shows an end view of an LED print head in accordance with the present invention including a view of the lens array taken through a section 2—2 (dashed line) of FIG. 1 mounted thereon.

Referring now to FIG. 2, there is shown an end view of an LED print head 20 comprising a sectional view of the lens array 10 taken through a section 2—2 (see dashed line) of FIG. 1, an LED array 25 comprising a plurality of LEDs (not shown), and a plurality of LED drivers 24 which are mounted on a system board 26 in accordance with the present invention. More particularly, the array 25 of LEDs is mounted on a major surface 28 of the system board 26, and the plurality of LED drivers 24 are mounted on either side of the array 25 of LEDs in a spaced-apart relationship therewith on the major surface 28 of the system board 26. The lens array 10 of light focusing lenses (not specifically shown) are then mounted in place on the array 25 of LEDs and the plurality of LED drivers 24.

In accordance with the present invention, the number of metal contacts 13 in the pattern of metal contacts 13 corresponds in number to the number of electrodes of the array 25 of LEDs and the associated electrodes of the LED drivers 24. The pattern of metal contacts 13 is formed on a bottom surface of each of the leg sections of the lens array frame 12. The elongated metal contacts 13 are used for mounting the lens array frame 12 onto the array 25 of LEDs and the plurality of LED drivers 24. The lens array frame 12 is mounted on the array 25 of LEDs and the LED drivers 24 by pressing the leg sections of the lens array frame 12 down onto the components 25 and 24 mounted on the system board 26. These metal contacts 13 perform the function of connecting wires used in conventional printers.

The printer 20 illustrated by FIG. 2 comprises a multiplicity of light-emitting diodes (LEDs) constituting the LED array 25 formed on a semiconductor substrate 26 (the system board), together with the electrodes required to drive the individual LEDs. Printing is effected by the controlled emission of light, which is achieved by the application of a prescribed forward bias by the LED drivers 24 which are located a prescribed distance from the electrodes of the LEDs.

While in prior art printers wires are used to connect the electrodes of the LED array 25 to the electrodes of the LED drivers 24, in the present invention, the lens array 10 is mounted on the system board 26 so that the pattern of metal contacts 13 formed on the lens array frame 12 are positioned to interconnect the associated LED and LED driver 24 electrodes. Thus, metal contacts 13 are patterned on the mounting contact surface of the lens array frame 12, with the number of metal contacts 13 being the same as the number of associated electrodes of the LEDs of the LED array 25 and the corresponding LED drivers 24. When the lens array frame 12 is then mounted by pressing the frame 12 down onto the LED array 25 and the LED drivers 24, all of the associated electrodes are connected simultaneously in a single operation, eliminating a need for single wire-by-wire bonding. More particularly, the lens array frame is positioned so that the patterned metal contacts 13 on the bottom surface of the lens array frame 12 so that the metal contacts 13 bridge the space between electrodes of the array LEDs and associated electrodes of the LED drivers and provide electrical contact therebetween. Accordingly, there is achieved a high-density LED print head 20 which is not subject to the mechanical precision of a wire-bonding machine. With photolithography, the formation of the pattern of metal contacts 13 on the lens array frame 12 can be controlled to about one micron, making it possible to produce high-density print heads 20.

It is appreciated and understood that the specific embodiments of the invention described hereinbefore are merely illustrative of the general principles of the invention. Various modifications may be made by those skilled in the art which are consistent with the principles set forth. For example, LED print heads can be produced in a variety of sizes by changing (a) the pattern of metal contacts 13 formed on the lens array frame 12, (b) the combination of the LED array 25 and the LED drivers 24, and (c) the dimensions of the individual LED array 25 and the lens array 10 elements. In this regard, the LED array 25 can be arranged with the LED drivers 24 provided on just one side thereof. Alternatively, in cases where the electrodes of the LED array 25 are not positioned parallel to the electrodes of the LED drivers 24, the pattern of metal contacts 13 can be changed to match the orientation of the associated electrodes. This ensures that proper electrical contact is achieved between the associated LEDs and LED drivers.

What is claimed is:

1. A light emitting diode (LED) print head comprising:

a plurality of LEDs formed in an array and mounted on a substrate, each LED comprising at least one electrode;

a plurality of LED drivers mounted on the substrate in a spaced-apart relationship to the plurality of LEDs, each of the LED drivers comprising at least one electrode;

a lens array; and a lens array frame attached to the lens array comprising a predetermined surface which is patterned with metal contacts that correspond in number to the number of LED array electrodes and associated LED driver electrodes, the lens array frame being positioned so that the patterned metal contacts on the predetermined surface bridge the space between electrodes of the array LEDs and associated electrodes of the LED drivers to provide electrical contact therebetween.

2. The print head of claim 1 wherein the lens array frame comprises a first and a second leg section which are attached to opposite sides of the lens array and extend beyond a major surface of the lens array to position the lens array a predetermined distance from the array of LEDs.

3. The print head of claim 2 wherein the patterned metal contacts are disposed on the predetermined surface of at least one of the first and second leg sections.

4. The print head of claim 2 wherein the patterned metal contacts are disposed on the predetermined surface of at least two of the first and second leg sections.

5. The print head of claim 1 wherein the patterned metal contacts are oriented on the predetermined surface substantially parallel to each other and in a direction normal to predetermined opposing sides of the lens array.

6. The print head of claim 1 wherein the patterned metal contacts are oriented on the predetermined surface to match the electrode orientation of the LEDs and the associated LED drivers.

7. A light emitting diode print head comprising:

a plurality of LEDs formed in an array and mounted on a substrate, each LED comprising at least one electrode;

a plurality of LED drivers mounted on the substrate in a spaced-apart relationship to the plurality of LEDs, each of the LED drivers comprising at least one electrode;

a lens array; and a lens array frame attached to predetermined opposing sides of the lens array, the lens array frame comprising at least one predetermined surface which is patterned with metal contacts that correspond in number to the number of LED array electrodes and associated LED driver electrodes, the lens array frame being positioned so that the patterned metal contacts on the predetermined surface are oriented to match the electrode orientation of the array LEDs and associated electrodes of the LED drivers and bridge the space therebetween to make electrical contact between the associated electrodes.

8. The print head of claim 7 wherein the lens array frame comprises a first and a second leg section which are attached to opposite sides of the lens array and extend beyond a major surface of the lens array to position the lens array a predetermined distance from the array of LEDs.

9. The print head of claim 8 wherein the patterned metal contacts are disposed on the predetermined surface of one of the first and second leg sections.

10. The print head of claim 8 wherein the patterned metal contacts are disposed on the predetermined surface of both of the first and second leg sections.

11. The print head of claim 7 wherein the patterned metal contacts are oriented on the predetermined surface substantially parallel to each other and in a direction normal to predetermined opposing sides of the lens array.

* * * * *